(No Model.)

H. MOELLER, H. J. KLINGENBERG & H. HAGGE.
AUTOMATIC SEED DROPPING MECHANISM FOR CORN PLANTERS.

No. 246,184.   Patented Aug. 23, 1881

Witnesses:
Fred Hampton.
H. C. Shaver.

Inventors.
Henry Moeller,
Henry J. Klingenberg,
Henry Hagge.
By Thomas G. Orwig, Atty.

United States Patent Office.

HENRY MOELLER, HENRY J. KLINGENBERG, AND HENRY HAGGE, OF ATLANTIC, IOWA.

AUTOMATIC SEED-DROPPING MECHANISM FOR CORN-PLANTERS.

SPECIFICATION forming part of Letters Patent No. 246,184, dated August 23, 1881.

Application filed April 2, 1881. (No model.)

*To all whom it may concern:*

Be it known that we, HENRY MOELLER, HENRY J. KLINGENBERG, and HENRY HAGGE, of Atlantic, in the county of Cass and State of Iowa, have invented an Improved Automatic Seed-Dropping Mechanism for Corn-Planters, of which the following is a specification.

Our invention relates to the manner of transforming rotary motion into rectilinear, and transmitting power and motion from a rotating axle in the carriage of a corn-planter to a reciprocating seed-slide, as required, to drop seeds at regular intervals of time and space as the complete machine is advanced across a field successively to plant check-rows.

Heretofore various devices have been used to accomplish the results contemplated; but our peculiar manner of combining a seed-slide, a sliding block, a crank-wheel having an adjustable wrist-pin, bevel-gear wheels, and a revolving carriage-axle, as hereinafter fully set forth, is novel and advantageous, in that it is simple, easily applied, adjusted, and operated, and less liable to get out of order than those devices in which most of the various elements have intermittent motions.

Figure 1:
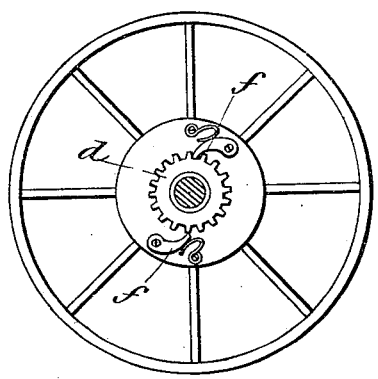
Figure 2:
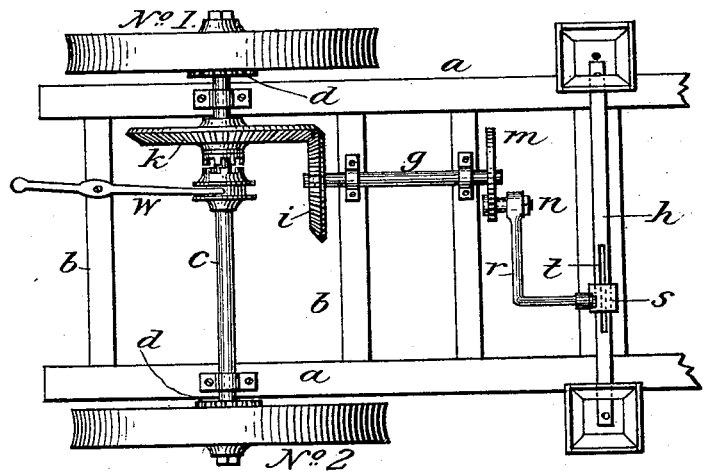

Figure 1 of our drawings is a side view of one of the carriage-wheels, and shows our manner of combining it with the axle. Fig. 2 is a top view of our complete machine. Together they clearly illustrate the construction and operation of our complete invention.

$a\,a$ represent the side pieces, and $b\,b$ the cross-pieces, of a rectangular carriage-frame upon which our operative mechanism is mounted.

Nos. 1 and 2 are carriage-wheels, placed loosely upon the revolving carriage-axle $c$, and secured by means of removable nuts and screws on the ends of the axle.

$d\,d$ are ratchets, fixed on the axle $c$ in such a manner that pawls $f$ on the inner ends of the hubs of the wheels will engage the ratchets during the forward movements of the carriage and rotate the axle by means of power thereby transmitted from the wheels to the axle. During any backward motion of the carriage the pawls and ratchets will be inoperative, and the carriage-wheels will revolve and the axle remain stationary.

$g$ is a short shaft, mounted upon the carriage in a right-angled position relative to the revolving axle $c$ and the seed-slide $h$.

$i$ is a bevel-gear wheel fixed on the rear end of the shaft $g$, and engages a corresponding wheel, $k$, that is placed loosely upon the revolving axle $c$.

$m$ is a crank-wheel fixed on the front end of the shaft $g$.

$n$ is a wrist-pin, adjustably connected with the crank-wheel in such a manner that it can be moved in and out relative to the axis of the wheel for the purpose of regulating the length of stroke of the pitman $r$, that is connected therewith and also with a sliding block, $s$, that is fitted to and combined with the reciprocating seed-slide $h$ in such a manner that its sliding motion on the seed-slide is restricted by means of a slot, $t$, or other suitable stops equivalent to the ends of the slot.

$w$ represents a clutch device, by which a loose bevel-gear wheel, $k$, on the revolving axle $c$ is locked to the axle and the driving mechanism of our operating device thrown in and out of gear at pleasure.

From the detailed descriptions of the construction and functions of the various parts of our invention their unitary actions are obvious and the practicability and utility of our attachment for corn-planters apparent.

We do not broadly claim that a continuous motion of a number of devices combined to impart an intermittent reciprocating motion to a seed-slide is new, but simply that our particular combination of specific devices to accomplish the results contemplated is novel and greatly advantageous.

We claim as our invention—

In automatic corn-planter mechanism, the combination of the rotating shaft $g$, the crank-wheel $m$, the adjustable wrist-pin $n$, the pitman $r$, the sliding block $s$, and a seed-slide having a slot, $t$, substantially as shown and described, for the purposes specified.

HENRY MOELLER.
HENRY J. KLINGENBERG.
HENRY HAGGE.

Witnesses:
JOHN MOELLER,
FRIEDRICH MOELLER.